(12) United States Patent
Wessel

(10) Patent No.: US 9,680,270 B2
(45) Date of Patent: Jun. 13, 2017

(54) APPARATUS FOR ENHANCED MERCHANDISE DISPLAY

(71) Applicant: Elmer A. Wessel, Lincoln, NE (US)

(72) Inventor: Elmer A. Wessel, Lincoln, NE (US)

( * ) Notice: Subject to any disclaimer, the term of this patent is extended or adjusted under 35 U.S.C. 154(b) by 0 days.

(21) Appl. No.: 14/703,699

(22) Filed: May 4, 2015

(65) Prior Publication Data

US 2015/0333490 A1 Nov. 19, 2015

Related U.S. Application Data

(60) Provisional application No. 61/993,966, filed on May 15, 2014.

(51) Int. Cl.
| | | |
|---|---|---|
| *H01R 25/14* | (2006.01) | |
| *H02B 1/01* | (2006.01) | |
| *H01R 4/48* | (2006.01) | |
| *H02B 1/20* | (2006.01) | |

(52) U.S. Cl.
CPC .............. *H01R 25/142* (2013.01); *H01R 4/48* (2013.01); *H02B 1/01* (2013.01); *H02B 1/20* (2013.01)

(58) Field of Classification Search
USPC .................................. 174/19, 52.1; 362/133
See application file for complete search history.

(56) References Cited

U.S. PATENT DOCUMENTS

| | | | | |
|---|---|---|---|---|
| 9,098,823 | B2* | 8/2015 | Slesinger | H01R 25/142 |
| 2009/0244925 | A1* | 10/2009 | Snagel | H01R 25/142 |
| | | | | 362/648 |
| 2010/0012600 | A1* | 1/2010 | Clontz | A47F 5/0043 |
| | | | | 211/26 |
| 2012/0230018 | A1* | 9/2012 | Wiemer | A47F 5/103 |
| | | | | 362/133 |
| 2014/0055987 | A1* | 2/2014 | Lindblom | A47F 3/001 |
| | | | | 362/125 |

\* cited by examiner

*Primary Examiner* — William H Mayo, III
*Assistant Examiner* — Krystal Robinson
(74) *Attorney, Agent, or Firm* — Dobbin IP Law; Geoffrey E. Dobbin

(57) ABSTRACT

A power distribution apparatus including a power supply conduit extending a length of a fixture and at least one power tap connected into the conduit, one embodiment of which may feature a saddle and at least one prong making operative contact with the power supply conduit. An electronic control module may be located proximate the saddle. The power tap may also be connected to a power distribution trough, which may have a plurality of walls, with lips, about a base. Power conductor strips may extend from the prongs along a length of the trough. Product enhancement devices may then access the power distribution trough at any point along the power distribution trough's length. A power-out-connector may be positionable along a power distribution trough for enhancement device access. The power-out-connector may feature at least one spring prong which interfaces with at least one lip and at least one power conductor strip.

11 Claims, 22 Drawing Sheets

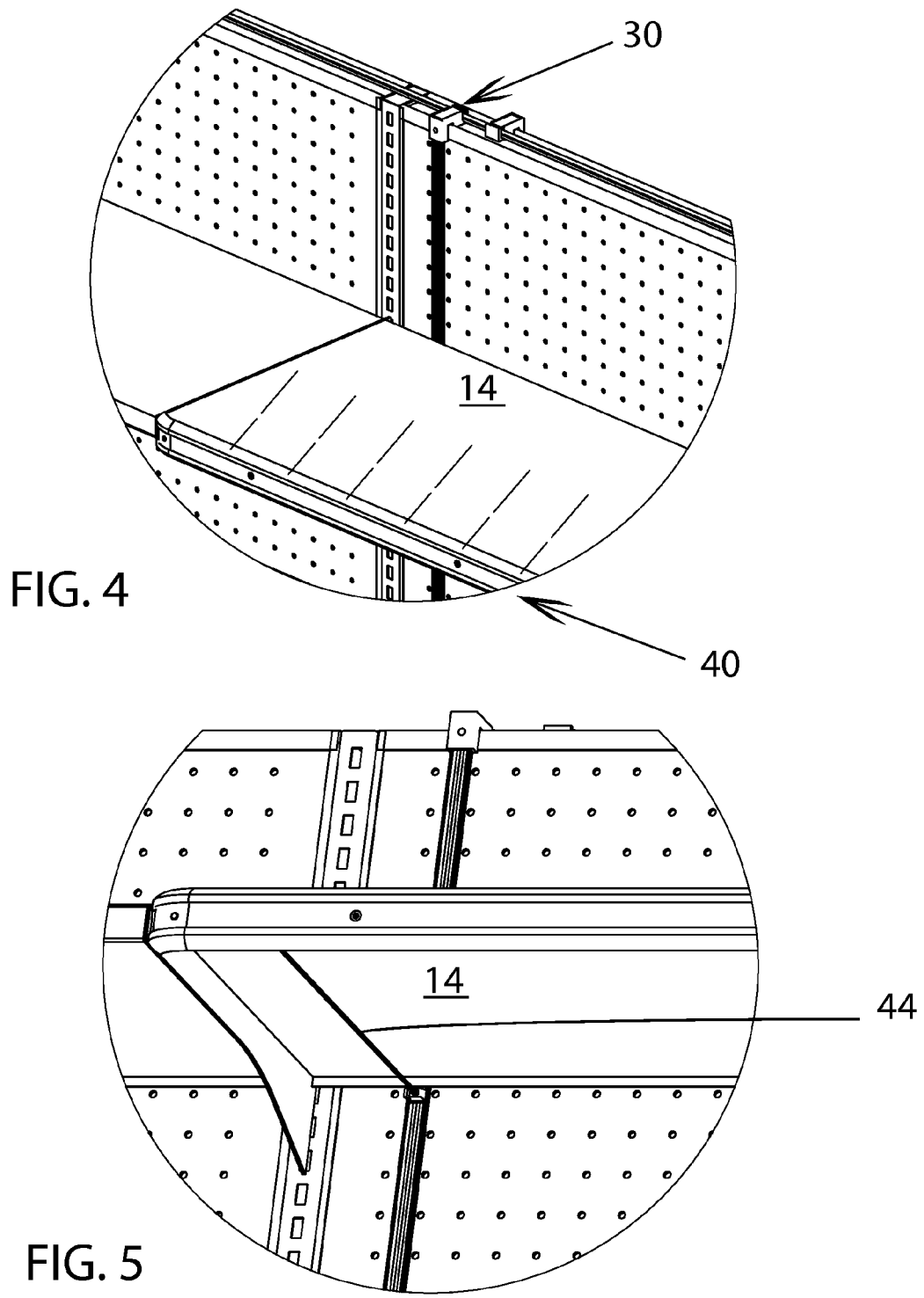

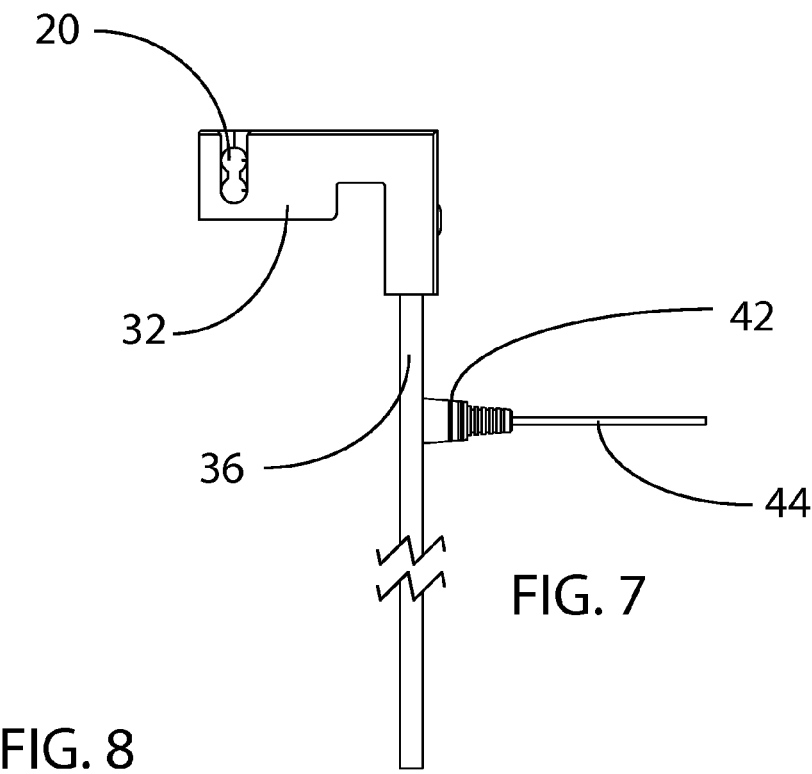
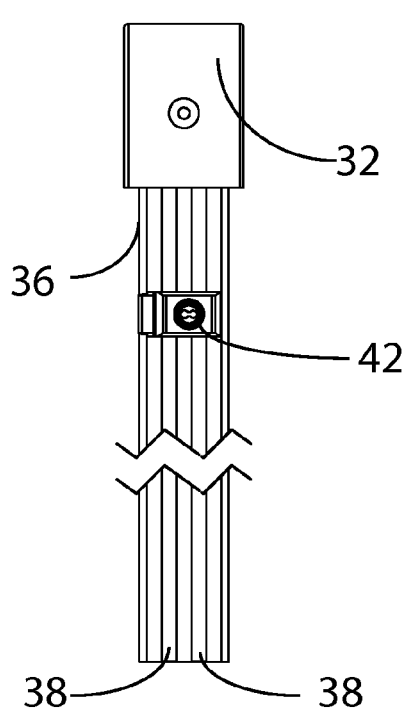
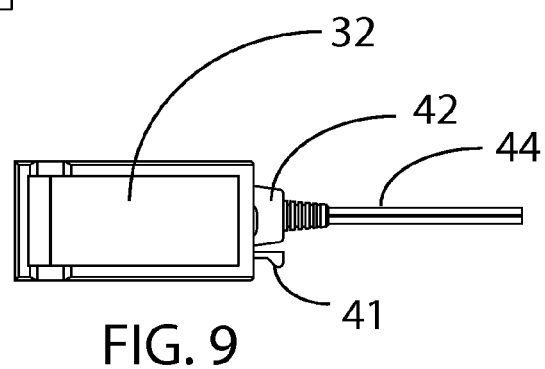
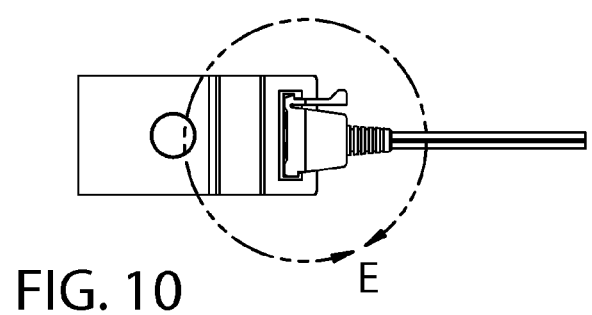

FIG. 13
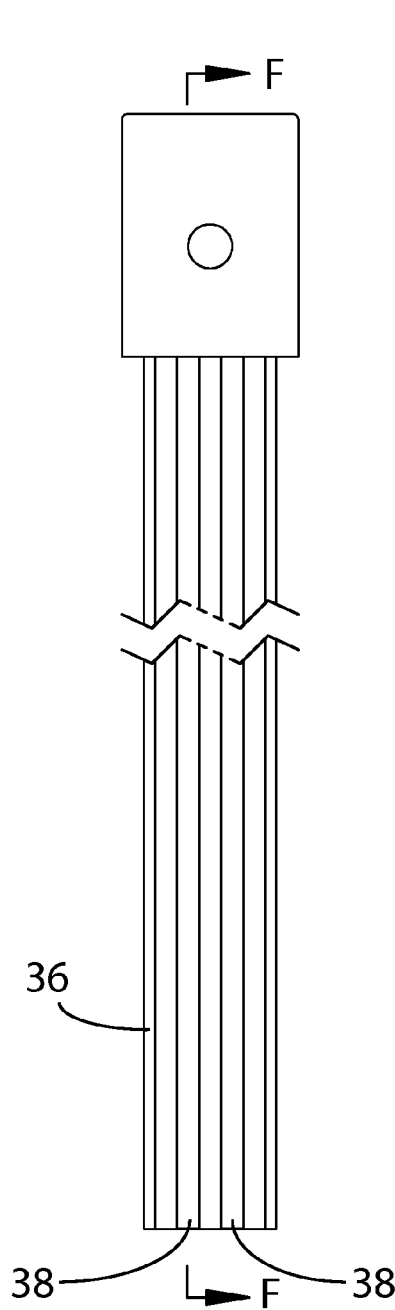
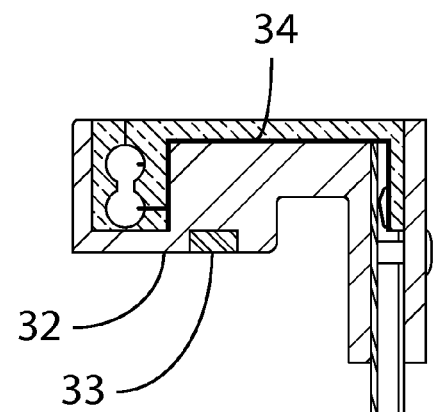
FIG. 14
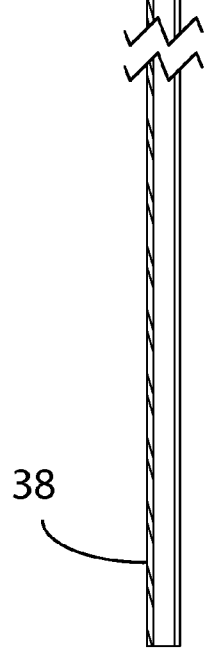

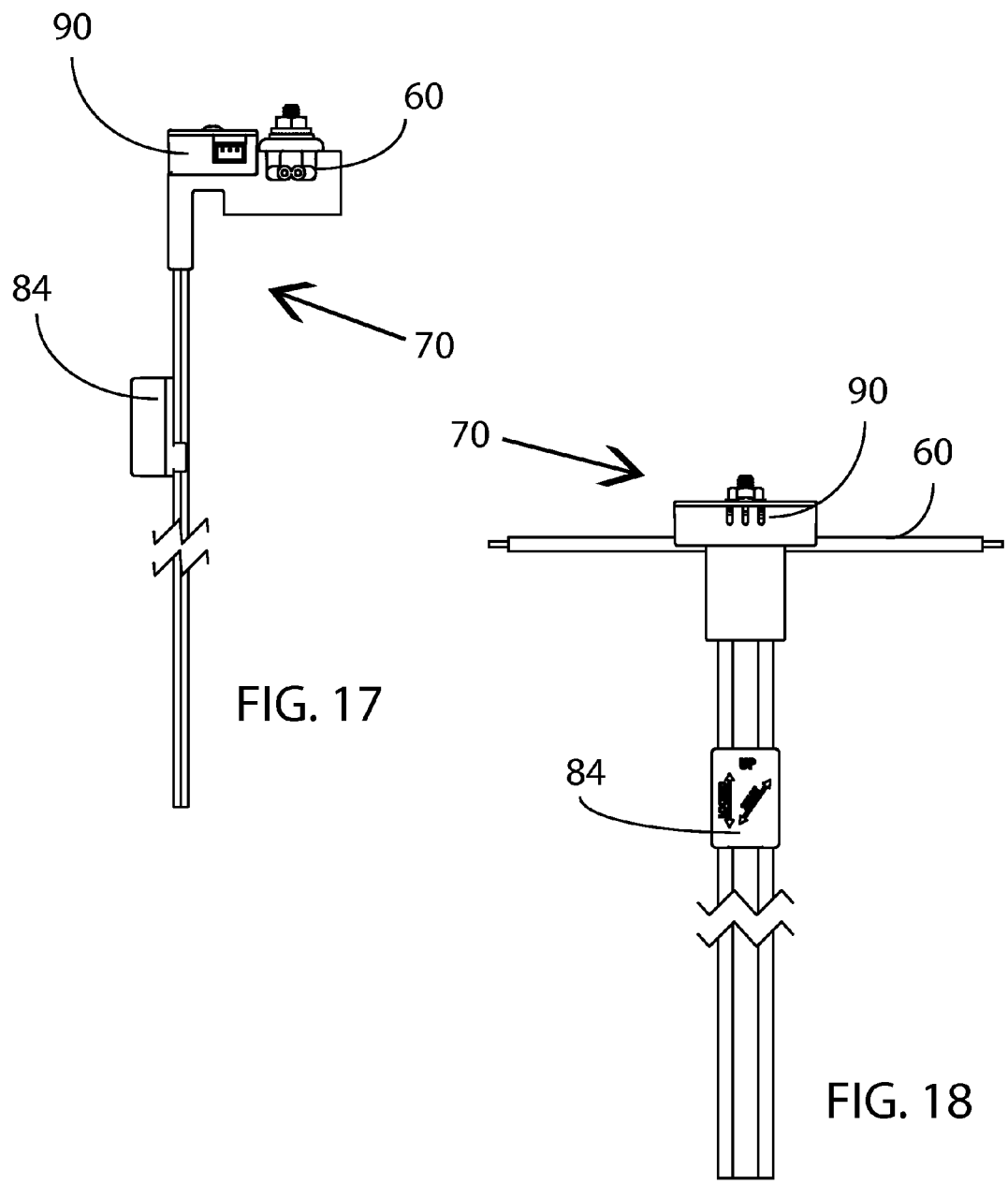

APPARATUS FOR ENHANCED MERCHANDISE DISPLAY

CROSS-REFERENCES TO RELATED APPLICATIONS

This Application claims priority as a non-provisional perfection of prior filed application No. 61/993,966, filed May 15, 2014, and incorporates the same by reference in its entirety herein.

FIELD OF THE INVENTION

The present invention relates to the field of merchandizing and in certain embodiments relates to a system and method to supply power to central areas of a retail environment so that enhanced lighting and other marketing strategies may be employed for product displayed in those areas.

BACKGROUND OF THE INVENTION

Merchandising is a necessary discipline for retail sellers. It includes the pricing, advertising, packaging, and other factors known to effect customer behavior in regard to a product. One aspect of merchandising is the proper display of a product. Proper display of a product, or visual merchandising, is known to increase the sales of that product as customers are more disposed to purchase attractive looking product. Manufacturers and wholesalers are known to collectively spend billions of dollars each year to study and develop presentations, ad displays, Point of Sale (POS) displays and other aspects of visual merchandising in an effort to promote the sale of product and enhance brand imaging in the eye of the consumer.

One aspect of visual merchandising is lighting. Lighting displays may be simple, such as merely illuminating the product, or they may be more elaborate, using colors and patterns to attract a potential consumer's attention to the product. In any event, any use of lighting in visual merchandising requires power for the lighting. However, in many retail settings, in particular grocery and other similar settings, getting power to a particular display may prove difficult. Most grocery shelves are situated on long merchandisers known as "gondolas." These gondolas are usually the only structures in the middle of an otherwise empty floor plan—forming the aisles of the store. They are intended to be only semi-permanent and can be moved. As such, they have no major connections to the environment around them. This includes power connections. While certain gondolas may happen to be close to an outlet, there is no guarantee of such convenience. As there is usually no power in the central retail area of the store, any POS or other visual merchandising display which requires lighting or any other aspect which requires power, must then be battery powered. This increases the cost of such displays as they must be both designed appropriately and have an additional component. There is also no way to effectively add additional light to a current display of product on a regular gondola and an additional POS must be developed for even that simple alteration.

One thing needed, then, is a way to route power along a gondola and have that power easily accessed. When this is accomplished, simple lighting systems, or other enhancement devices, may be utilized to access the power and provide lighting anywhere along an existing gondola with no additional POS design or alteration. Other power utilizing merchandising techniques may be developed with the power system in mind, thereby reducing cost in the design and manufacture of such displays.

Some embodiments provide a structure and apparatus by which power may be routed along a gondola. Ideally, power access strips are positioned such that power may be accessible at any point along the gondola. Enhancement devices such as light strips are then provided such that each store may readily move these enhancement devices from one area of a gondola to another as different product is emphasized, either due to manufacturers paying for enhanced lighting of their native in-store display or when the retailer desires to promote a product. It is known that merely lighting a display will enhance consumer interest, so providing lighting becomes a cost-effective method to increase sales volume without necessarily decreasing product retail price.

Various embodiments disclosed herein may allow for powered displays to be utilized in the underserved (in regards to power) central area of a retail floor plan in a manner that is easily retro-fitted to existing merchandising structures.

SUMMARY OF THE INVENTION

Various embodiments of this invention provide an apparatus and method for providing power to enhancement devices, such as a lighting display, to selective areas of a store merchandizing fixture, such as a gondola. As such, the present invention's general purpose is to provide a new power distribution infrastructure that is easily retrofitted to existing merchandizer fixtures, such as gondolas, and similar structures, easily installed on future constructions and provides power to varying and selectable locations along the fixture.

To accomplish these objectives, one embodiment of the apparatus comprises a power supply conduit, such as a cord, extending a length of a fixture and at least one power tap connected into said conduit. One embodiment of the power tap may feature a saddle, through which the power supply conduit may pass, and at least one prong which may make operative contact with the power supply conduit. One embodiment may have two such prongs which are used to pierce insulation of a dual corded, insulated cable serving as a power supply conduit. Another embodiment may also provide an electronic control module of any type currently known or later developed, also in operative contact with the prong and power supply conduit. The power tap may also be connected to a power distribution trough extending from the power tap into a discrete region of the fixture. Said trough may have a plurality of walls about a base and each wall may have a lip. Power conductor strips may extend from the prongs or other electrical contacts in the power tap along a length of the power distribution trough. Product enhancement devices, such as light strips, low-voltage video displays, coupon dispensers, or the like, may then access the power distribution trough at any point along the power distribution trough's length. Another embodiment of the apparatus features a power-out-connector ("POC") positionable along a power distribution trough and into which an enhancement device may be plugged. An embodiment of the POC may feature at least one spring prong which may interface with both at least one lip and at least one power conductor strip. One embodiment of light strips is constructed to be easily mounted upon gondola shelves by utilizing the price strip C-channel found on most shelves. Other embodiments may utilize other methods of attachment, such as magnetic attraction, to be mounted thereon.

Some of the features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining various embodiments of the invention in detail, it is to be understood that the invention is not limited in its application to the details of construction and the arrangements of the components set forth in the following description or illustrated in the drawings. The invention is capable of still other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is a close-up view of the shelves of FIG. 2, taken in circle D.

FIG. 5 is a close-up view of the underside of the shelves of FIG. 4.

FIG. 7 is a side elevation of a power supply strip according to one embodiment of the present invention, with a light strip plug attached.

FIG. 8 is a front elevation of the power supply strip of FIG. 7.

FIG. 9 is a top plan view of the power supply strip of FIG. 7.

FIG. 10 is a bottom plan view of the power supply strip of FIG. 7.

FIG. 13 is a front plan view of the power supply strip of FIG. 7, without the light plug strip.

FIG. 14 is a sectional view of the power supply strip of FIG. 13, taken along line F-F.

FIG. 17 is a side elevation of the power supply strip of FIG. 15.

FIG. 18 is a front elevation of the power supply strip of FIG. 15.

DETAILED DESCRIPTION OF THE PREFERRED EMBODIMENT

With reference now to the drawings, various embodiments of the lighting apparatus are described. It should be noted that the articles "a", "an", and "the", as used in this specification, include plural referents unless the content clearly dictates otherwise.

Figure 1:
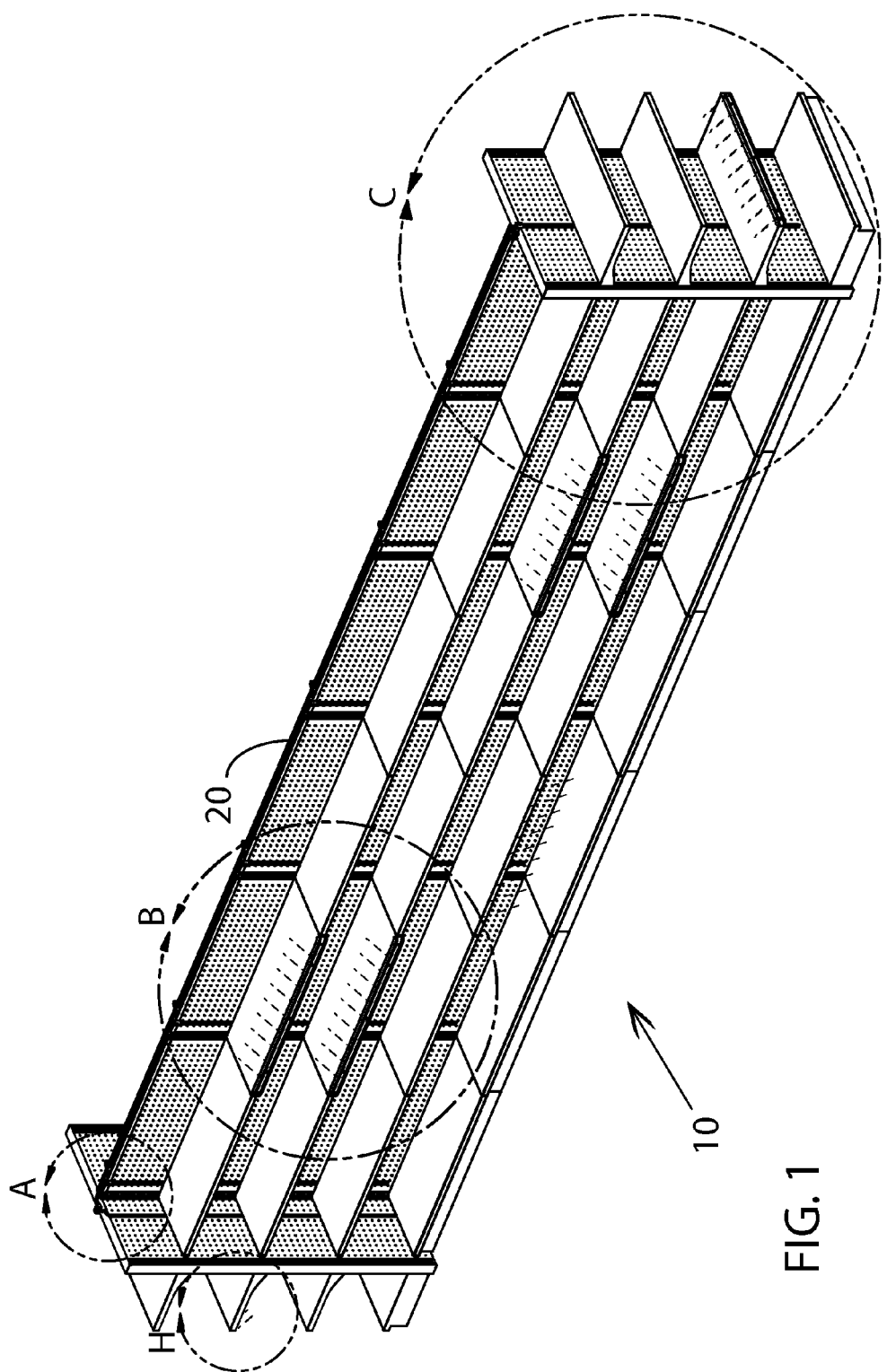
FIG. 1 is a perspective view of a gondola merchandizer on which one embodiment of the present invention is utilized.
Figure 3:
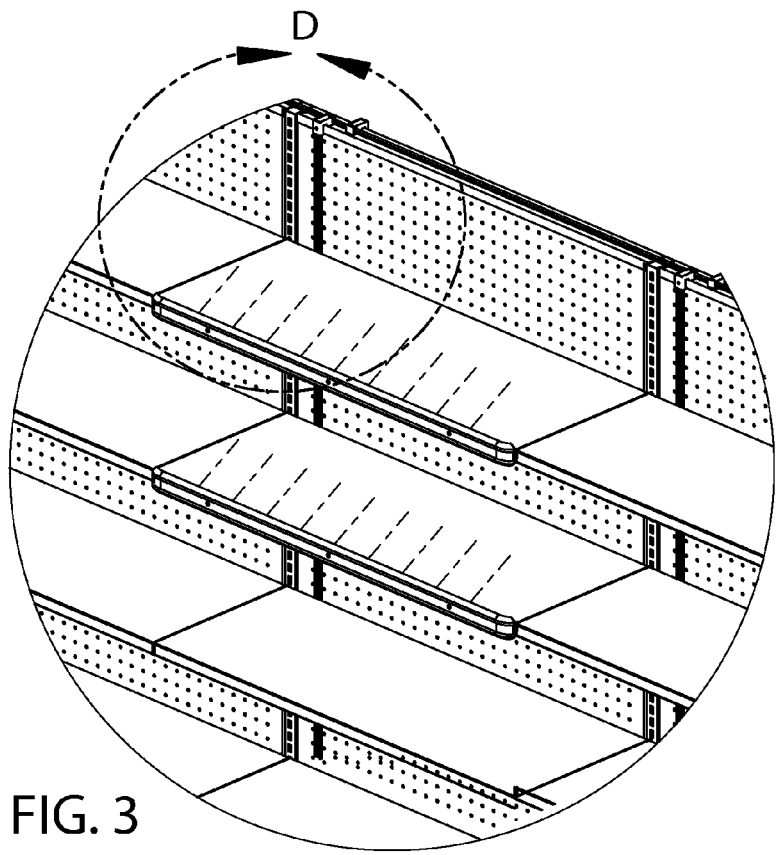
FIG. 3 is a close-up view of some illuminated shelves of the gondola of FIG. 1, taken in circle B.
Figure 2:
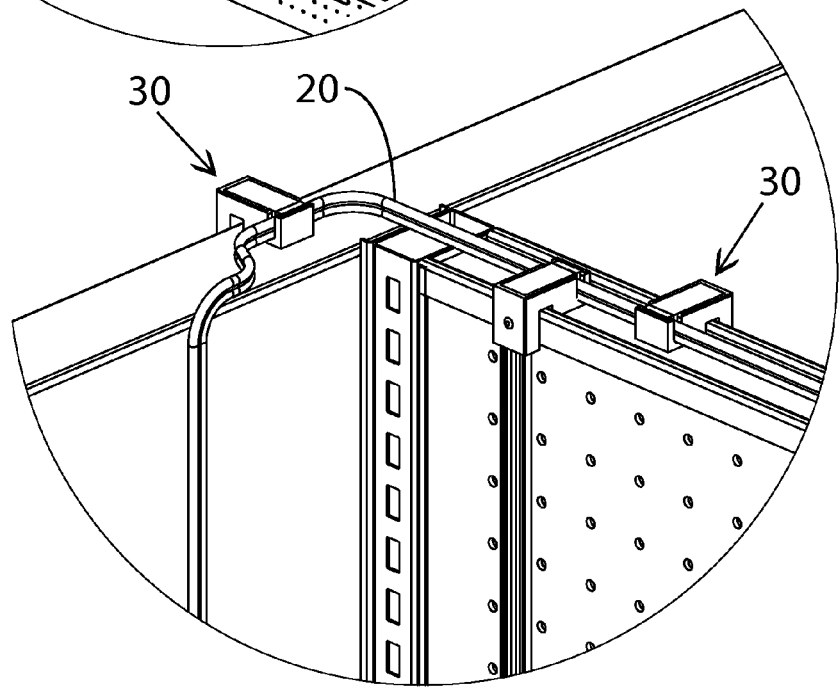
FIG. 2 is a close up view an end cap intersection showing a power supply cord and three power supply strips tapping onto said cord, utilized on the gondola of FIG. 1, taken in circle A.
Figure 6:
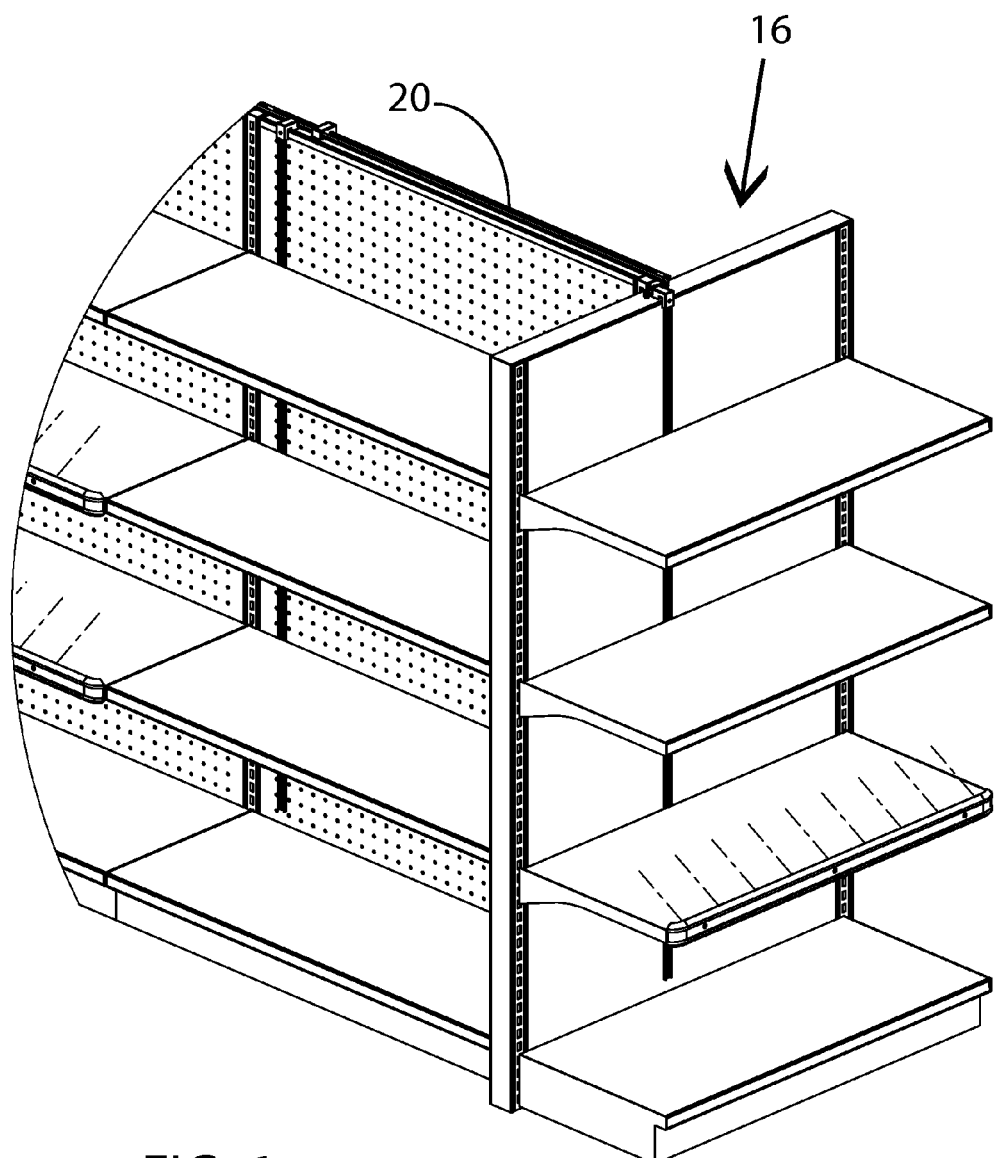
FIG. 6 is a close up view of the gondola end-cap, taken in circle C.
Figure 11:
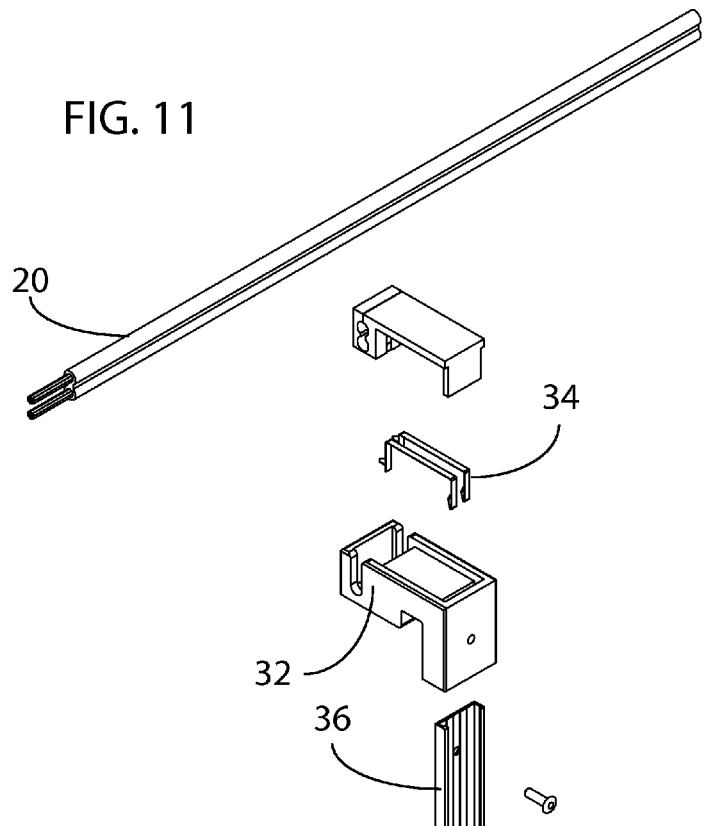
FIG. 11 is an exploded view of the power supply strip of FIG. 7, without the light strip plug.
Figure 12:
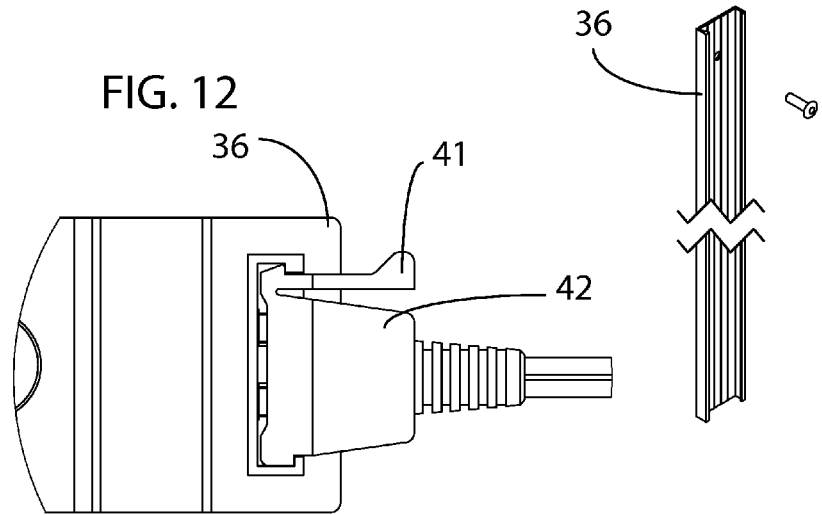
FIG. 12 is a close-up view of the power supply strip and light strip plug interface, taken in circle E of FIG. 10.
Figure 15:
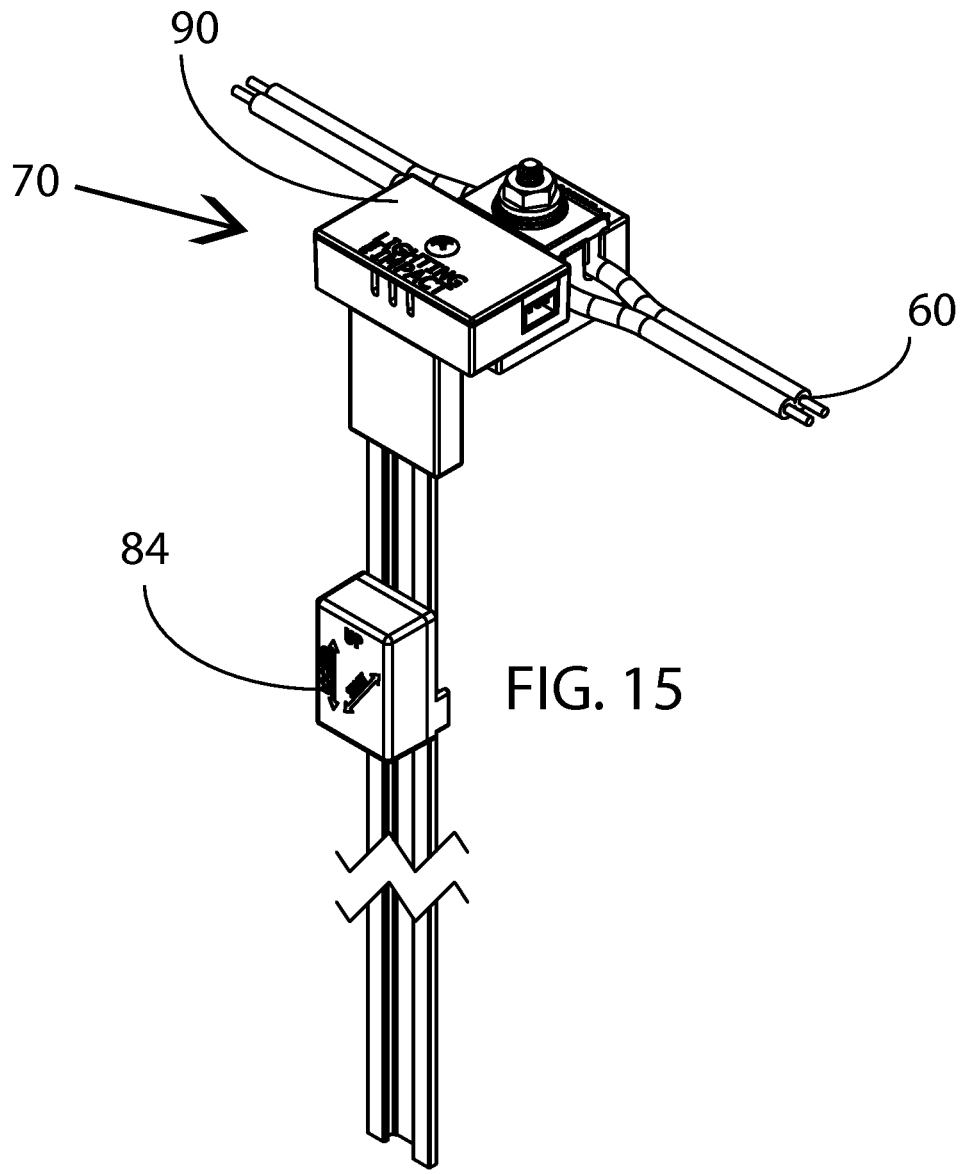
FIG. 15 is a perspective view of an alternate embodiment of the power supply strip.
Figure 16:
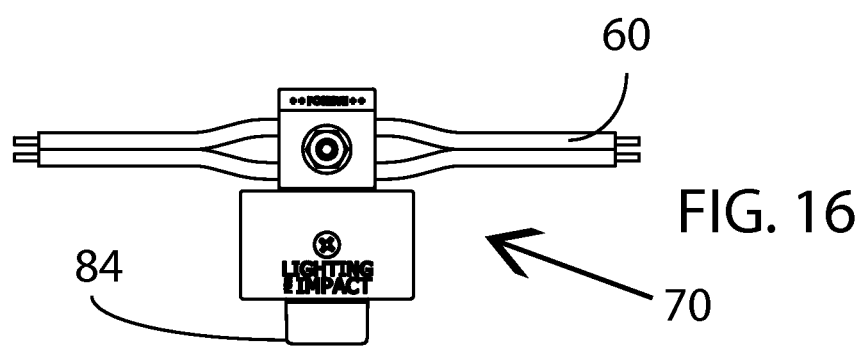
FIG. 16 is a top plan view of the power supply strip of FIG. 15.

With reference to FIG. 1, an apparatus may provide power throughout the length of a gondola 10. In some embodiments, the apparatus utilizes a power conduit such as a low voltage DC cord 20 which is connected to a power supply (not shown) and runs a length of the gondola 10 along its top edge. Because in this depicted embodiment a DC cord is used, there may be some voltage drop off over the length of the run of the conduit 20. This is easily accounted for by utilizing a higher than necessary voltage at the source and one or more transformers along the run. In this manner a uniform voltage may be applied to power strip along the entire length of the conduit. It may be ideal for a voltage of 12-24 V to be supplied to the power strips, though this may be varied according to individual purposes. Any appropriate dual copper braided or similar cord may be utilized and a higher voltage may also be utilized, but appropriate safeguarding may be needed. Power supply strips 30 tap into power cord 20 and extend down the gondola 10 at various locations (FIG. 2) and provide power to individual light modules 40, as shown in FIGS. 3-5. Light modules 40 may be located anywhere on the gondola 10, including the end caps 16 (FIG. 6). Each light module 40 is plugged into a power supply strip 30, usually with its cord 44 running under the shelf 14 on which it is mounted (FIG. 5).

One power supply strip is shown in FIGS. 7-14. At one end is a power tap saddle 32 which surrounds cord 20 and contains two leads 34 which pierce the insulation of the cord 20 and make contact with the contained conductors. The leads 34 extend through the power tap saddle 32 and connect to two parallel conductive strips 38 positioned in the trough 36. The power tap saddle 32, and associated power supply strip 30 and cord 20, may be secured to the gondola 10 by any appropriate fastener known or later developed in the art, though magnets positioned within the power tap saddle 32, such as the magnet 33 shown in FIG. 14, will suffice for most gondola structures. Plug 42 is secured within the trough 36 by a securement means, such as living hinge 41 interacting with a lip of the trough 36, and makes contact with the two conductive strips 38, completing the circuit with the LED's 43 residing in the light module 40 (FIGS. 30-37).

Figure 19:
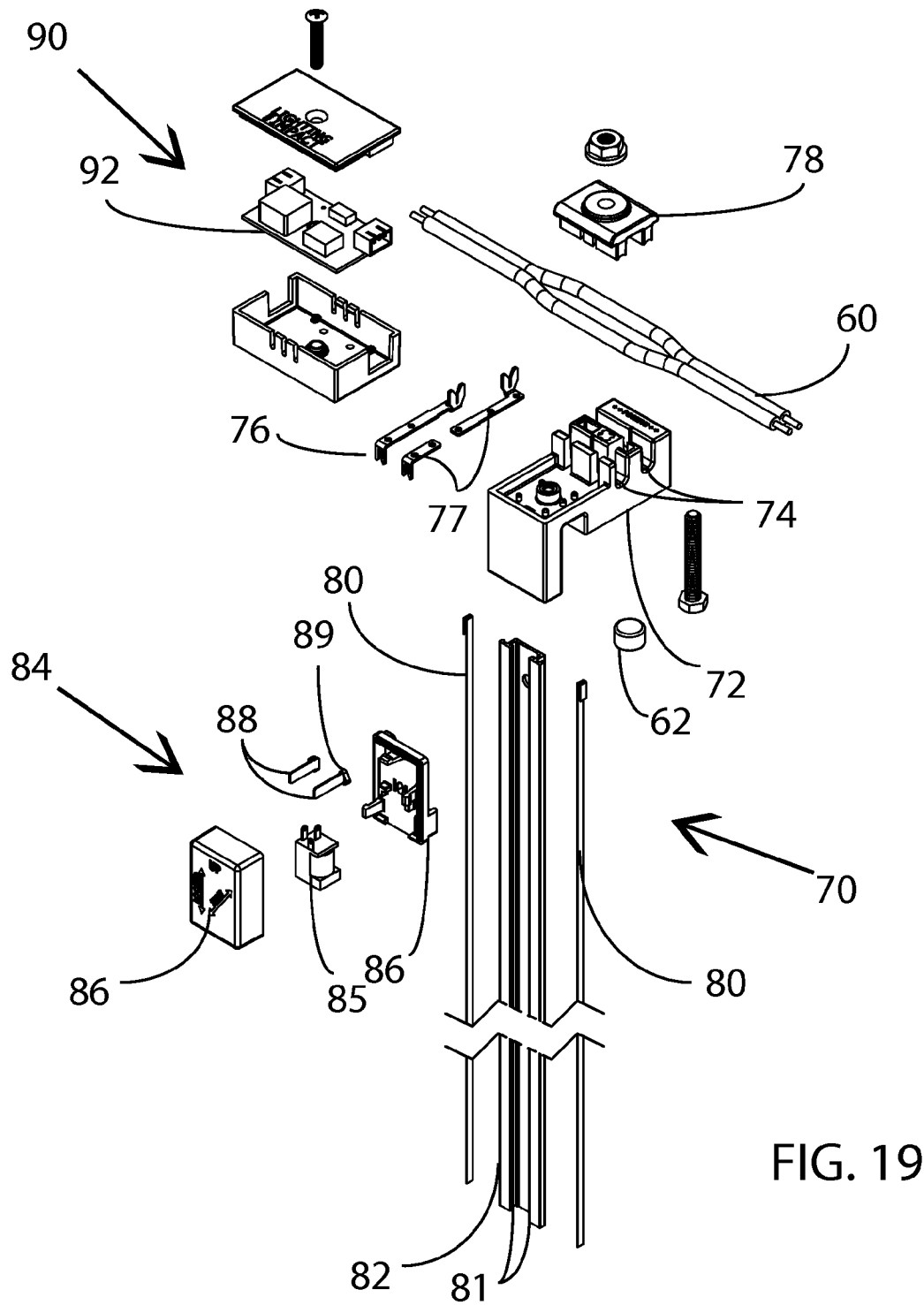
FIG. 19 is an exploded view of the power strip of FIG. 15.
Figure 20:
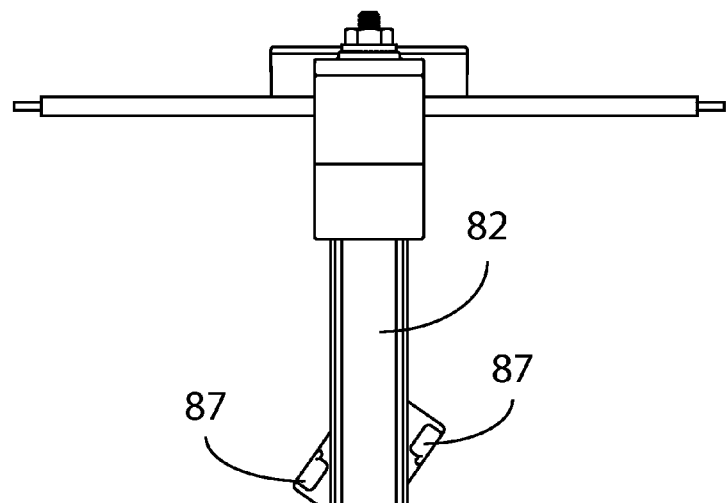
FIG. 20 is a rear elevation of the power strip of FIG. 15, with the POC disengaged.
Figure 21:
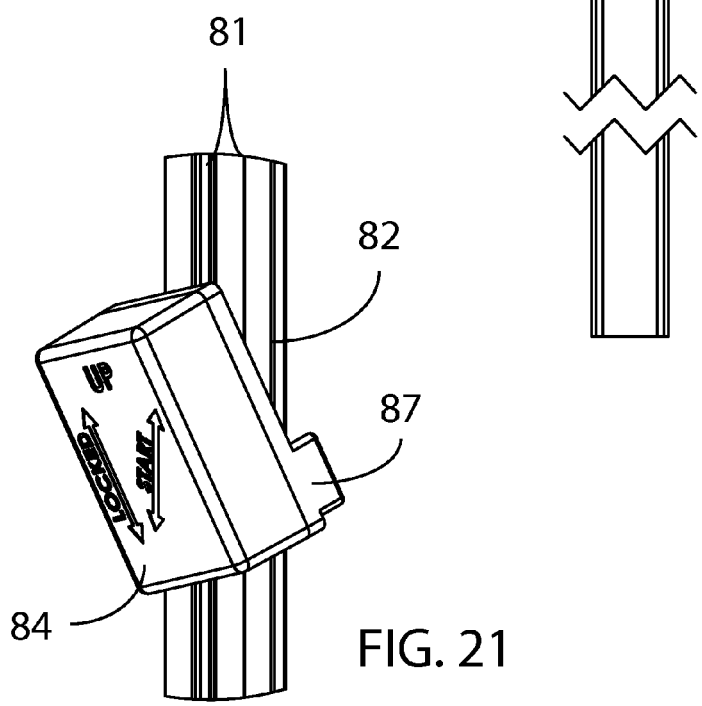
FIG. 21 is a close-up perspective view of the power strip of FIG. 20.
Figure 22:
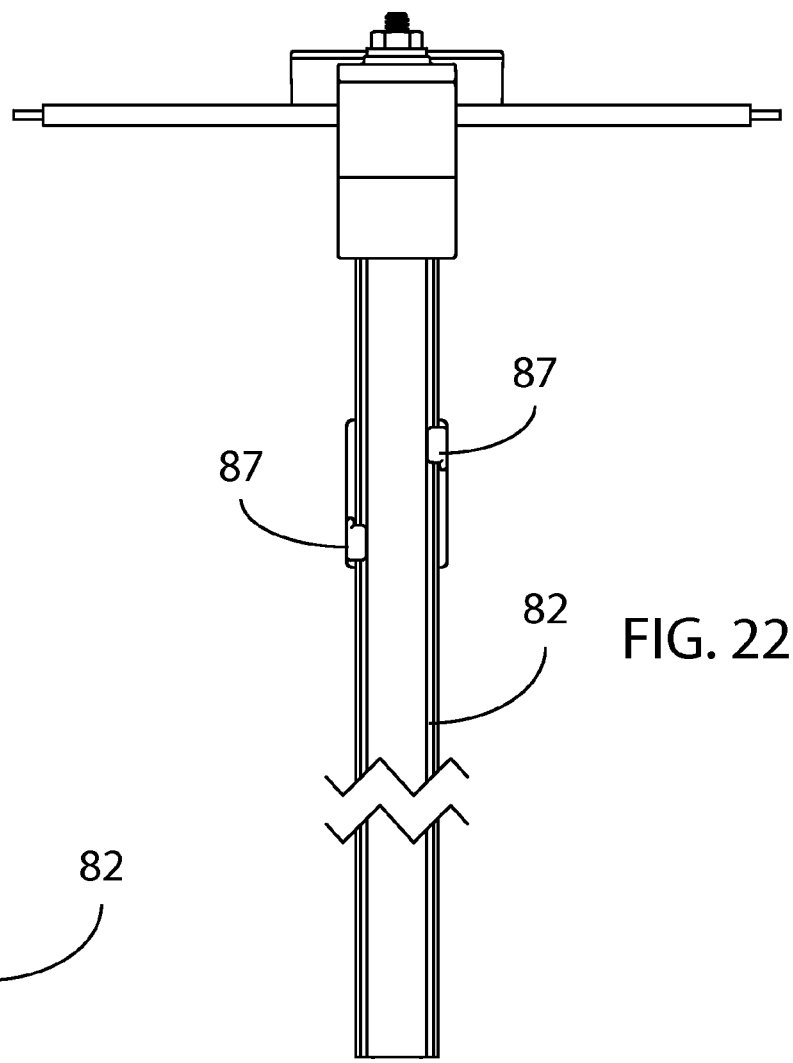
FIG. 22 is a rear elevation of the power strip of FIG. 15, with the POC engaged.
Figure 23:
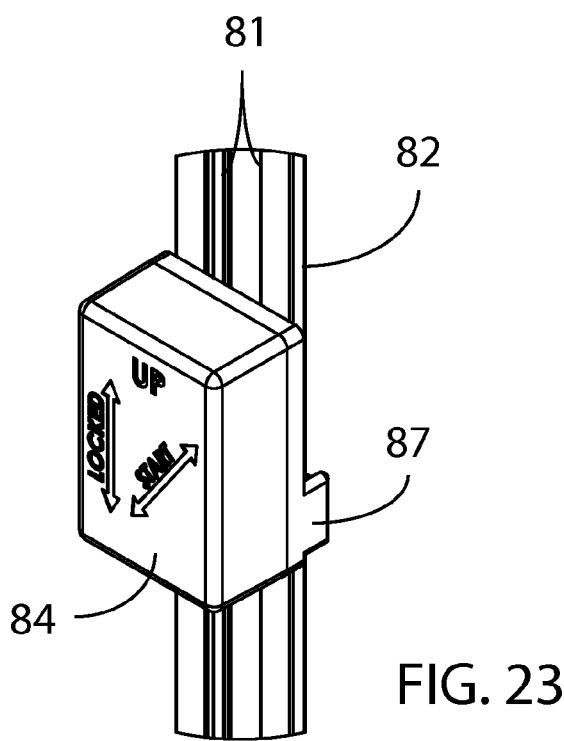
FIG. 23 is a close-up perspective view of the power strip of FIG. 22.
Figure 24:
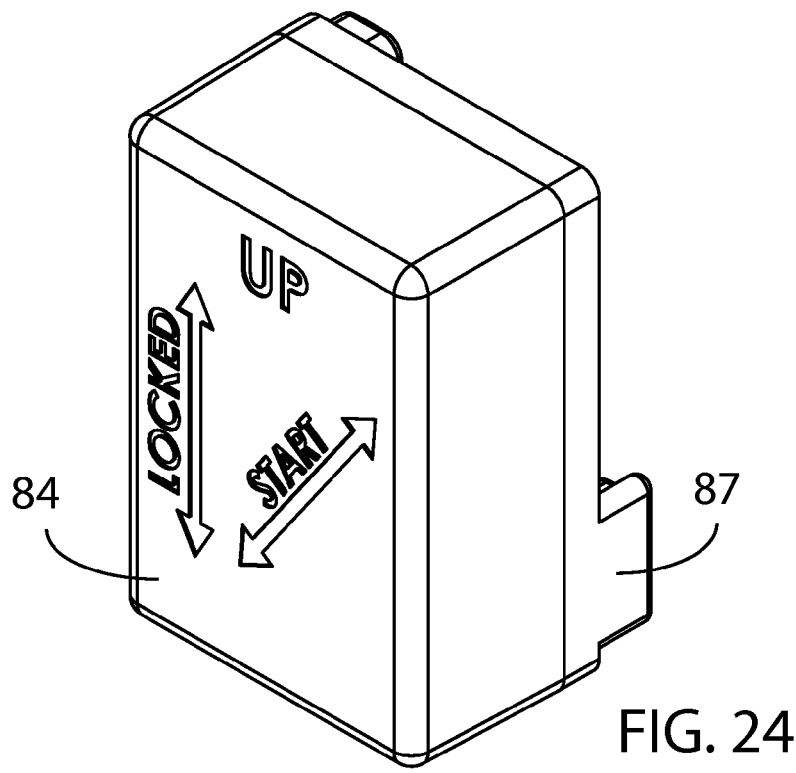
FIG. 24 is a perspective view of the POC utilized in the power strip of FIG. 15.
Figure 25:
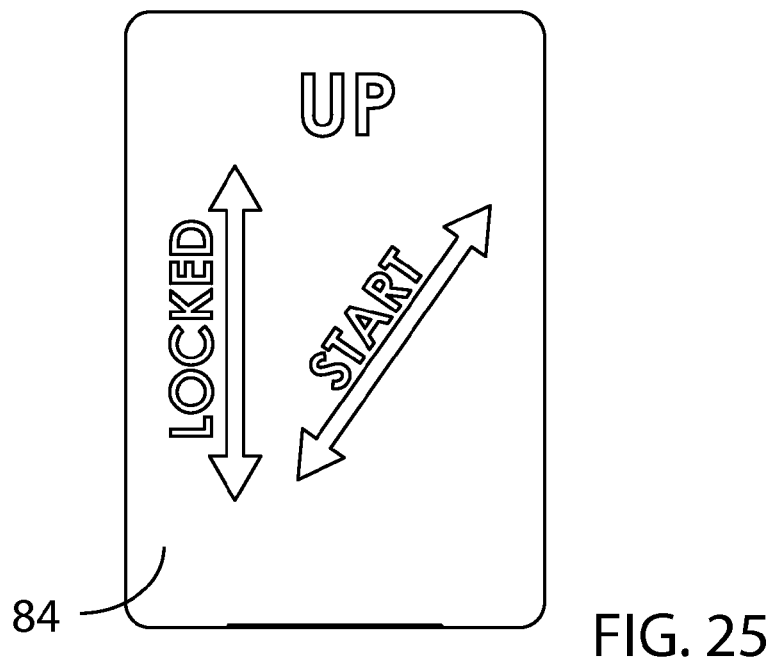
FIG. 25 is a front elevation of the POC of FIG. 24.
Figure 26:
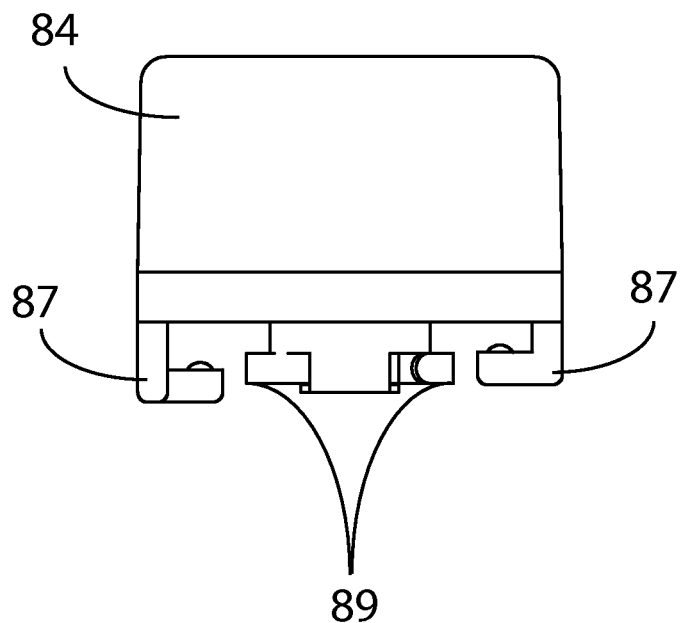
FIG. 26 is a bottom plan view of the POC of FIG. 24.
Figure 27:
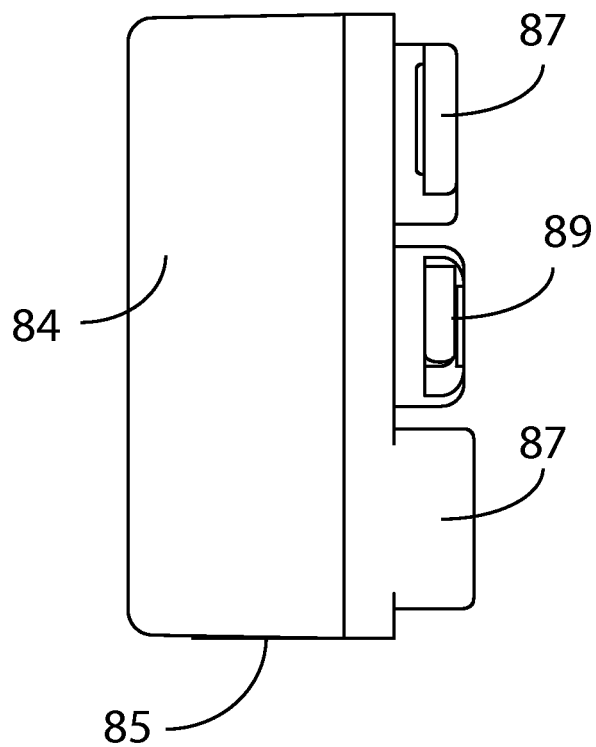
FIG. 27 is a side elevation of the POC of FIG. 24.
Figure 28:
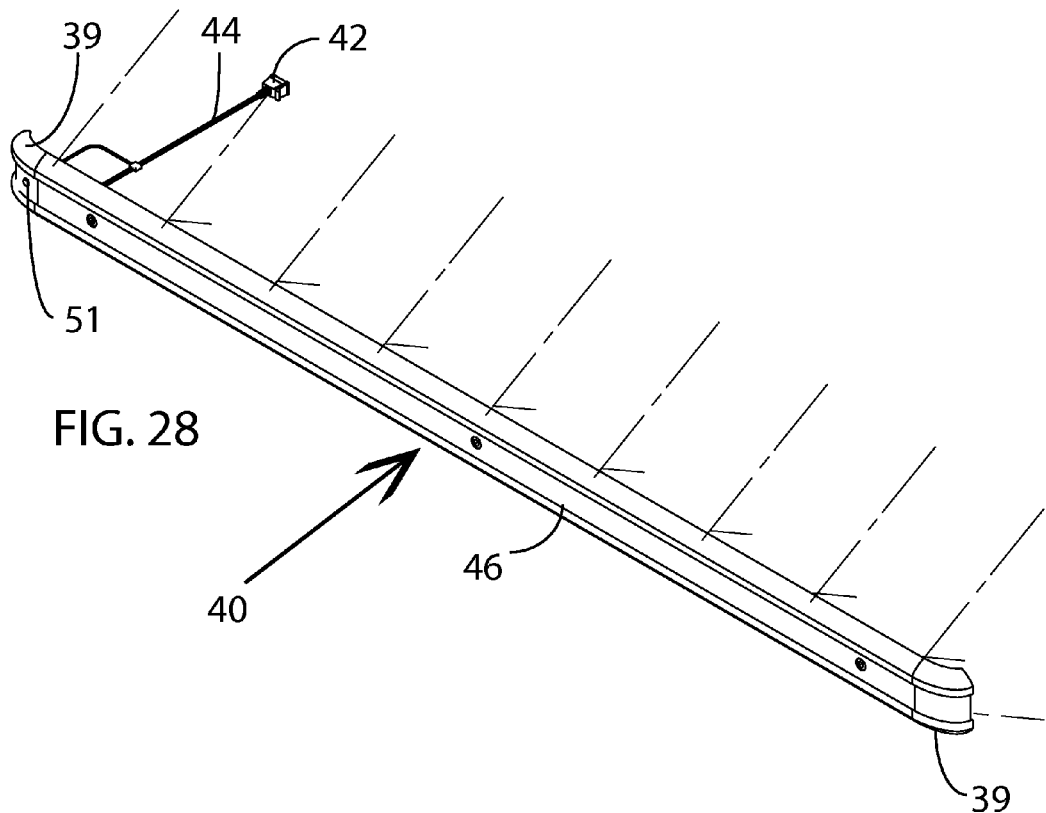
FIG. 28 is a perspective view of a light module which may be utilized in the present invention.
Figure 29:
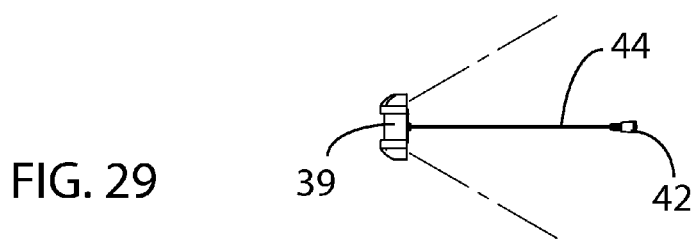
FIG. 29 is a side elevation of the light module of FIG. 28.
Figure 30:
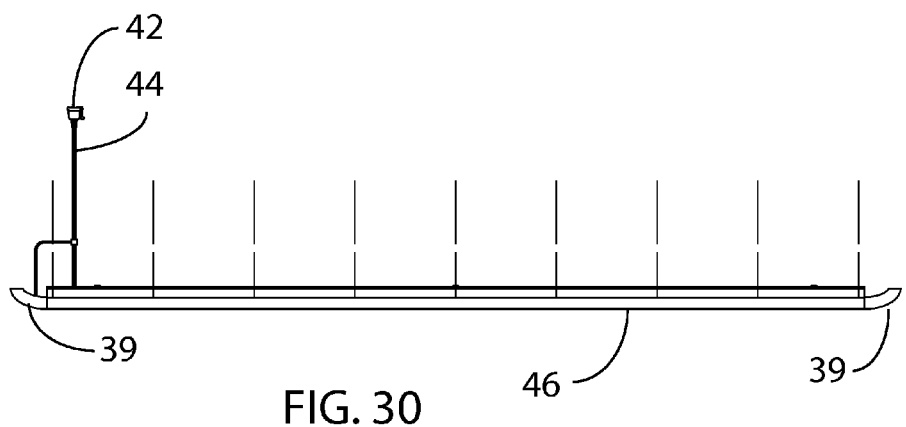
FIG. 30 is a top plan view of the light module of FIG. 28.
Figure 31:
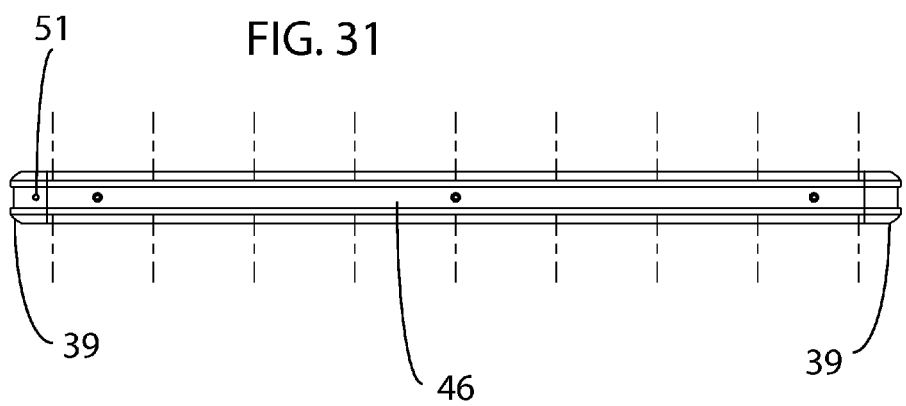
FIG. 31 is a front elevation of the light module of FIG. 28.
Figure 32:
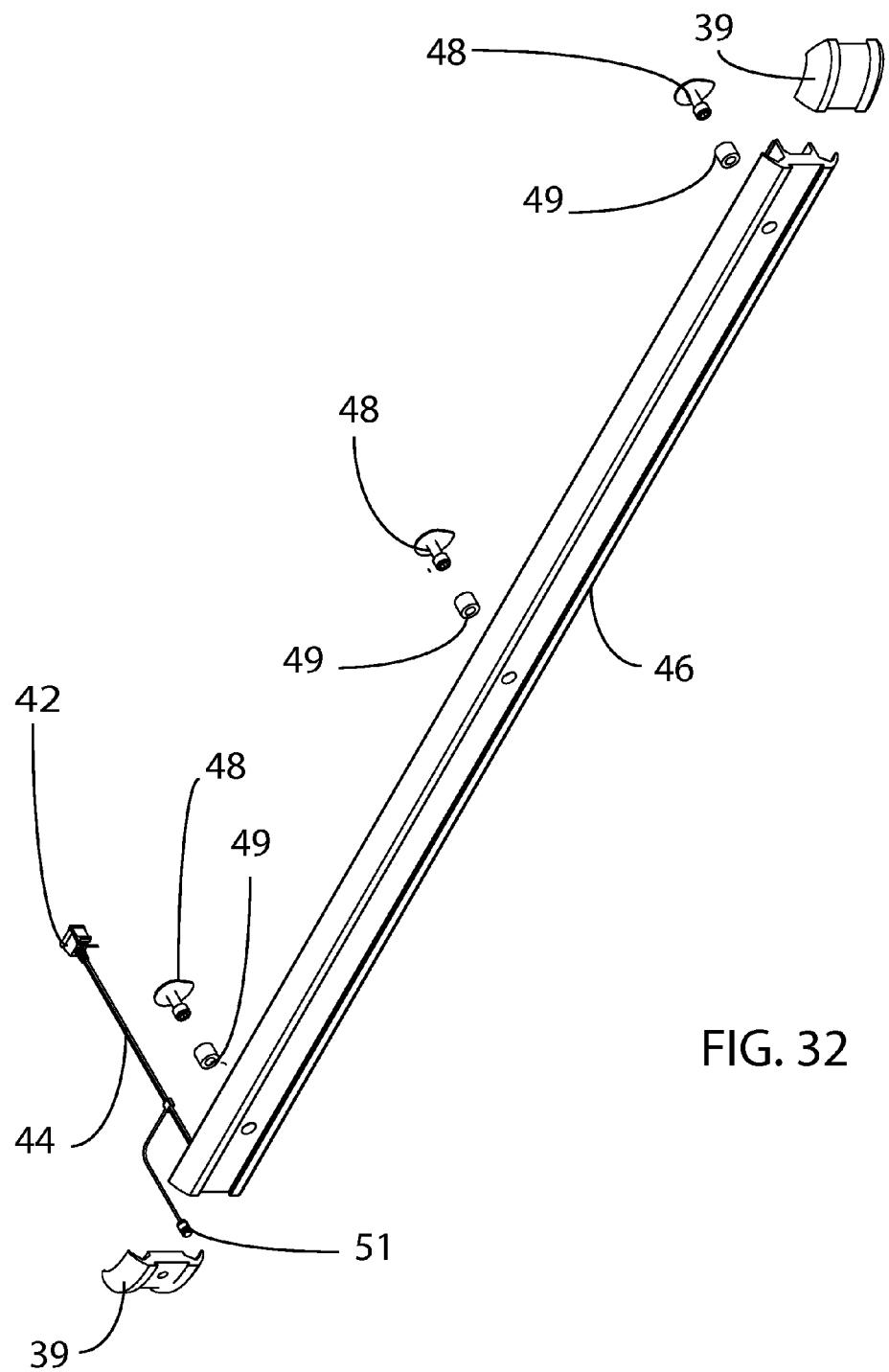
FIG. 32 is an exploded view of the light module of FIG. 28.
Figure 33:
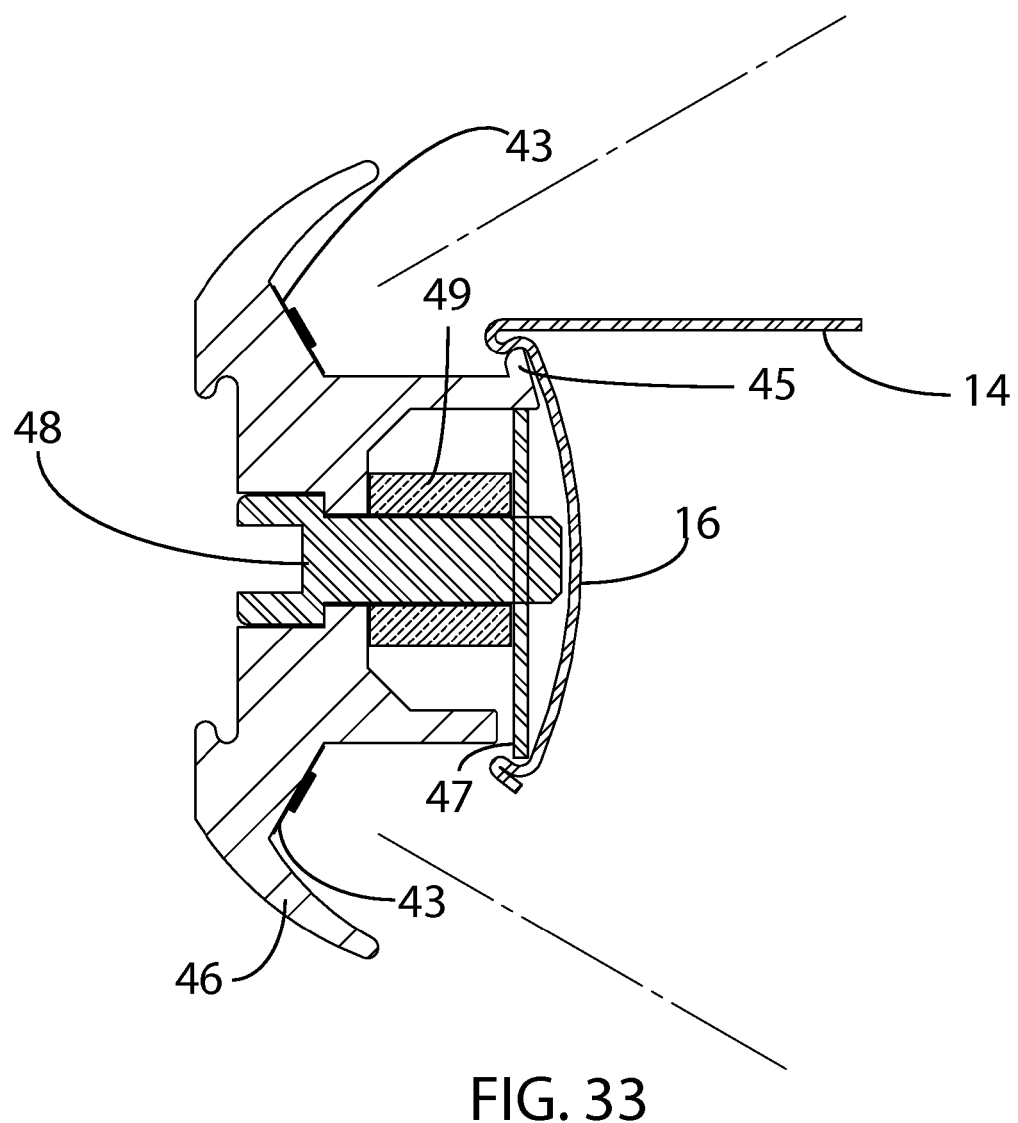
FIG. 33 is a sectional view of a light module of FIG. 28, mounted upon a gondola shelf.
Figure 34:
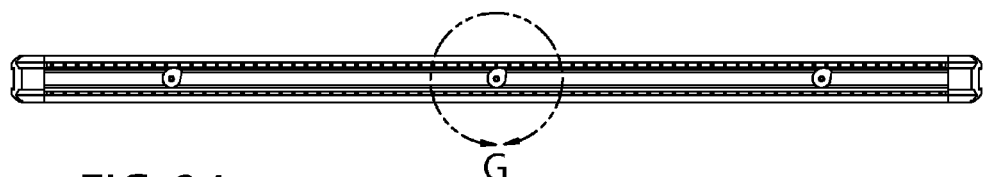
FIG. 34 is a rear elevation of the light module of FIG, 28.
Figure 35:
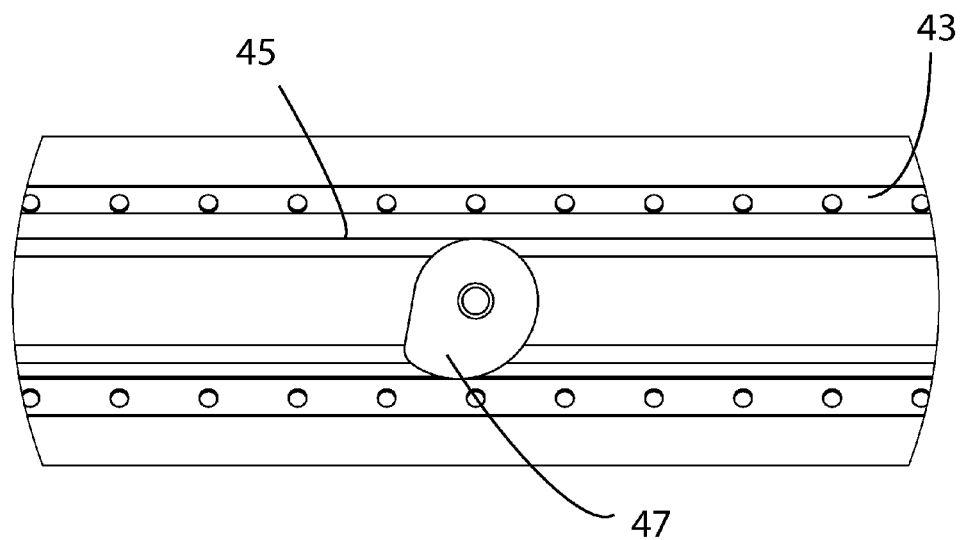
FIG. 35 is a close-up view of the light module of FIG. 34, taken in circle G.

Another embodiment of the strip is shown in FIGS. 15-29. As with the first embodiment, a cord 60 is extended along a length of a gondola and a power strip 70 taps into it (FIGS. 15-18). A magnet 62 (FIG. 19) or some other securement structure may be utilized to fasten the power strip to the gondola. As seen more clearly in FIG. 19, he preferred power strip features a replaceable control module 90 and an insertable POC 84 not present in the basic embodiment. As also can be seen in FIG. 19, a saddle 72 provides support for the cord 60 in a pair of parallel troughs 74. The cord 60 may for example be a dual, copper braided cord with the two parallel braids separated and each one positioned in one of the pair of troughs 74. Residing in each trough are electrical contacts 76,77 which pierce the insulation of the braids and extend perpendicular to the troughs 74 along a length of the saddle 72. Cord 60 is secured by a cap 78 in the in the troughs 74. One contact 76 extends a length of the saddle 72 and engages a power conductor 80. The other contact 77 is formed of two pieces separated by a gap. Control module 90 interfaces with this contact 77 so that power may be provided to its internal circuitry 92. The contact 77 likewise interfaces with a power conductor 80 parallel to the first.

The power strip may be made with the power conductors 80 extending a length of the power strip housing trough 82 and extending along an inside, protected, edge, though any parallel arrangement may work, as is shown, for example, in the first embodiment. The POC 84 contains an electrical connector, which may include any port or connector known or later developed and is represented by barrel connector 85, which is connected to two spurs 88 that extend outside the POC housing 86. The spurs 88 terminate in orthogonal spring prongs 89 which are positioned as pointing in opposite directions, towards the outer edge of the POC 84 (FIGS. 19, 8). In use (FIGS. 20 & 21) the POC 84 is positioned inside the power strip housing trough 82 at an angle and then twisted (FIGS. 22-23) into contact with the parallel power conductors 80, each underneath a lip 81 of the power strip housing trough 82. In this arrangement, the spring prongs 89 engage the conductors 80 while also engaging the lip 81. Positioning with the lip 81 prevents the POC 84 from being pulled out of the trough 82 while friction between the prongs 89 and the conductors 80 (and associated trough walls) maintains the POC 84 in its vertical position relative to the power strip housing trough 82. Two ears 87 may be fashioned on the POC housing 86 to provide a positive stopping point for the twisting action and further integrate the POC 84 and power strip housing trough 82 (FIGS. 20-27).

Control modules 90 (FIG. 19) may contain any type of electronic device which is desired by a designer. Control module 90 resides on the saddle 82, for example, over connectors 76,77. Control module 90 taps into power from connector 77 to operate whatever circuitry 92 it contains. Devices which may be contained in the control module include but are not limited to transformers, (as discussed above), electronic beacons, Wi-Fi transmitters and receivers, Bluetooth transmitters and receivers, motion sensors, and LED's. It is also conceivable that the control module 90 may also function as a power-out-connector and may include some electrical interface such as a barrel connector.

One enhancement device which may be utilized with the power supply strip are light modules. Exemplary light modules are disclosed in FIGS. 30-37. These exemplary light modules 40 are modules which feature an elongate body 46 designed to hold at least one strip of LEDs 43 at an angle such that product on shelves 14 will be illuminated. The body 46 features a lip 45 along its length and a plurality of posts 48 passing through its body. The upper lip 45 anchors into the upper portion of the C-channel 16 of the shelf 14. The post 48 has a slotted head and a mostly disc-shaped back 47. A flat portion of the back 47 allows the light module 40 to be positioned in the C-channel 16 and the posts 48 rotated in a manner to position a rounded portion of the back 47 to interface with the lower portion of the C-channel, locking it in place. A spacer 49 allows the post 48, and the associated light module body 46 to remain in place. Removable end caps 39 are placed over the ends of light module body 46 and may hold a motion sensor switch 51, or some other functional component such as a beacon, operatively connected to light module cord 44.

Figure 36:
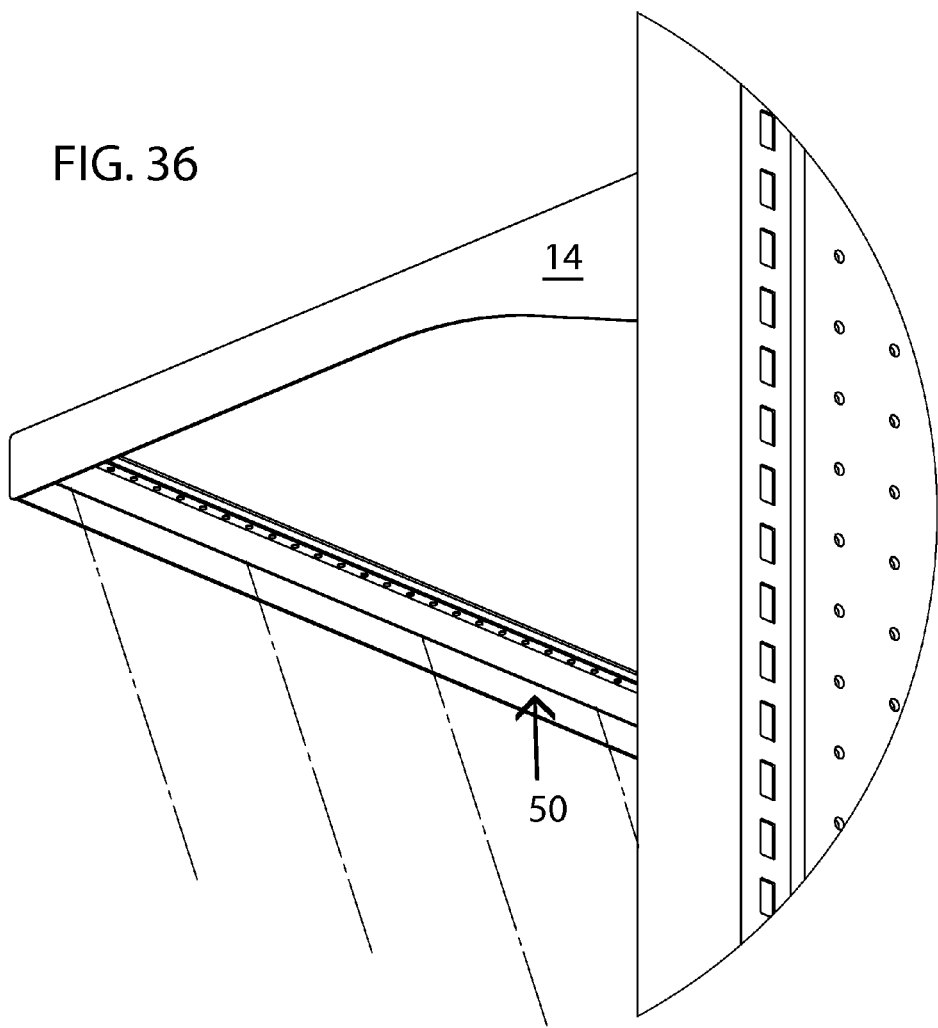
FIG. 36 is a close-up view of a shelf of the gondola merchandizer of FIG. 1, utilizing an alternate light module, taken in circle H.
Figure 37:
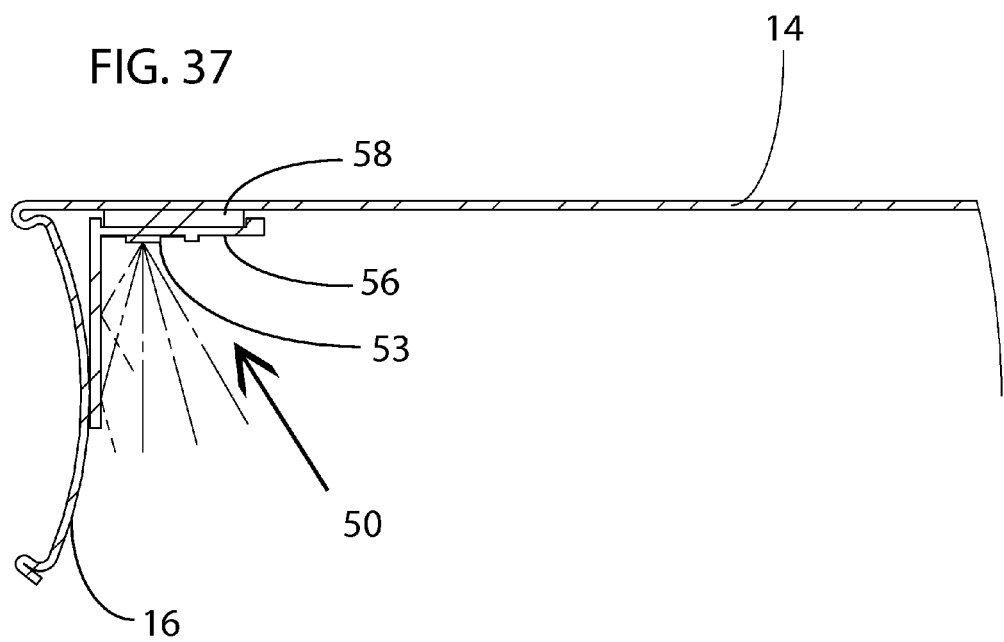
FIG. 37 is a sectional view of the shelf and light module of FIG. 36
Figure 38:
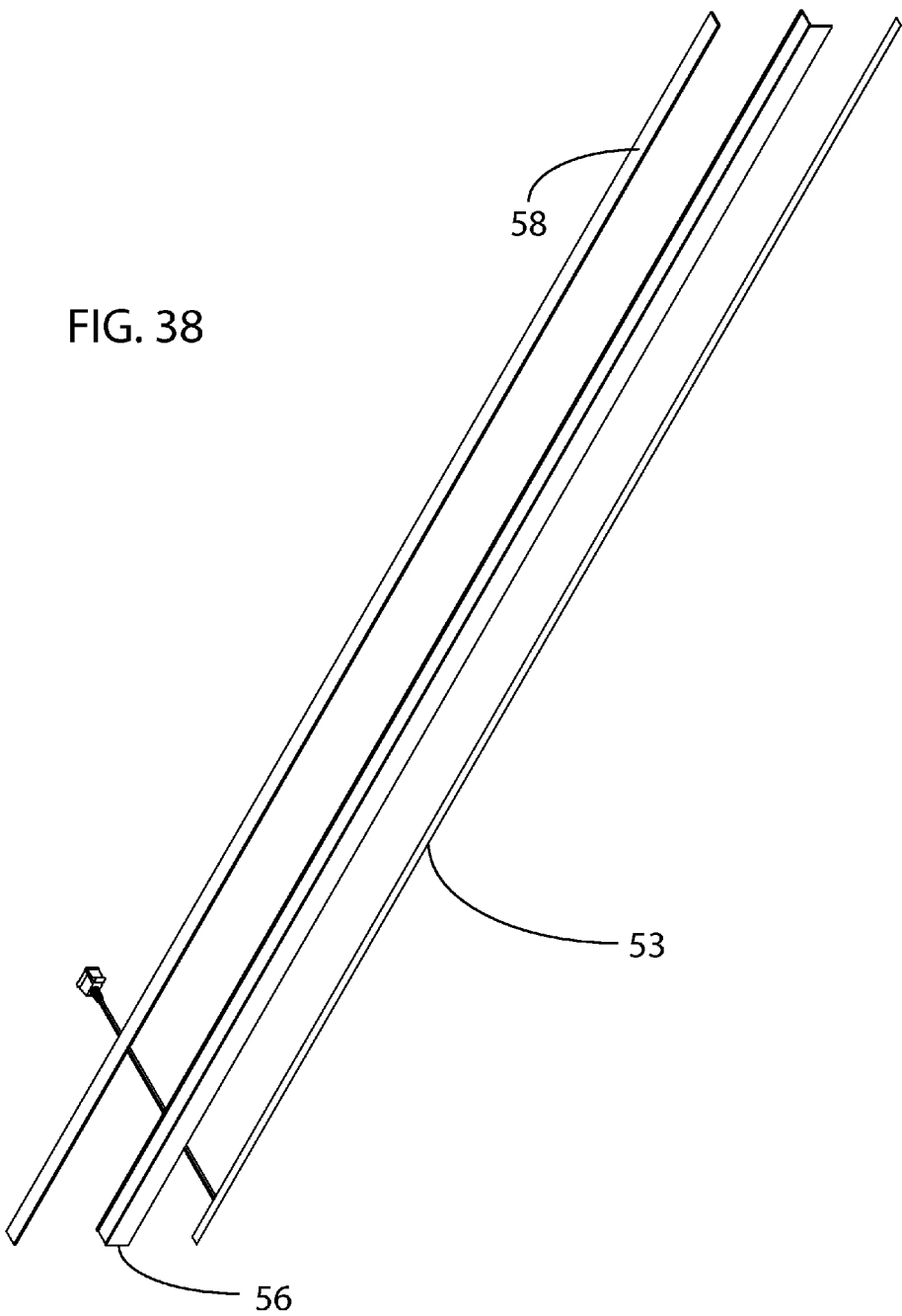
FIG. 38 is an exploded view of the light module of FIG. 36.

An alternate embodiment of a light module 50 is shown in FIGS. 36-38. This embodiment affixes to the underside of the gondola's shelving 14, thereby lighting product held underneath the shelf 14 on which the strip is mounted. An LED strip 53 is affixed to an L-bracket 55 and said L-bracket has a magnet 57 adhered thereto. The light strip 50 may then be affixed to any ferrous or otherwise magnetic surface. By positioning the light module 50 under the shelf 14, it may not interfere with access to product contained on the merchandizer. L-bracket 55 may have a reflective surface (FIG. 24) to further reflect light onto product.

In use, as shown in FIG. 1, the cord 20 is positioned along the top edge of the gondola 10. Power supply strips 30 are positioned along the length of the gondola 10, usually at about 8-foot intervals though this is customizable, with one power supply strip positioned for each end cap. Low voltage power is provided to the cord, keeping it in a ready state. When a shelf 14 is desired to be illuminated, a light module 40 is positioned in the C-channel 16 and the posts 48 rotated such that the rounded portion and the upper lip 45 interface with the C-channel 16. Likewise, if the alternate light module 50 is utilized, it is merely positioned and secured to an underside of an upper shelf. The power cord of the light module is then routed towards the nearest power supply strip. The plug interfaces with the power supply strip by clipping therein or interfacing with a provided POC and contacts the parallel conductors completing the circuit, and powering the light module. It is, of course, readily understood that the mounting and connection steps outlined herein will be dependent upon the ultimate structure, type, and function of the display enhancement device desired. Therefore, these use instructions should not be seen as limiting when other display enhancement devices are desired to be used with a power supply apparatus according to the present invention.

Although the present invention has been described with reference to particular embodiments, numerous modifications and variations can be made and still the result will come within the scope of the invention. Of particular note, there are many types of shelving, including different styles and those made of different materials such as wood or plastic. Shelves may or may not have pricing C-channels. It is also to be understood that while embodiments of the invention are described with particularity towards lighting, other systems which utilize electrical power may also receive power from the central power supply architecture herein described. Various means of connection to the power supply for these systems may also be employed. Accordingly, the methods of mounting the light modules on the shelves should be interpreted in the appended claims as including logical equivalents and the embodiments described in this specification should be seen as exemplary and not limiting. It is also to be understood that lighting units are but one example of powered display enhancement for merchandisers. Currently known or later developed display enhancements which can utilize power compatible with the system disclosed above may be utilized with this system and should be seen as equivalents to the light modules described herein. No limitation with respect to the specific embodiments disclosed herein is intended or should be inferred.

What is claimed is:

1. A power supply apparatus comprising:
   a. a continuous power supply conduit connected to a power source, said power supply conduit positioned along a length of a fixture;
   b. at least one power tap structure, said power tap structure further comprising:
      i. a saddle containing a portion of the power supply conduit which passes continuously therethrough; and
      ii. at least one power tap conductor integrated with the saddle and in operative connection to the power supply conduit;
   c. an electronic control module in operative contact with the power tap structure; and
   d. a power distribution trough in operative contact with the at least one power tap structure and extending a height of the fixture away from the power supply conduit, the power distribution trough further comprising:
      i. a trough body with a base and two walls, each wall having a lip; and
      ii. at least one power conductor strip residing along one wall, underneath one of the lips and in operable connection to the at least one power tap conductor;
   wherein the power supply conduit provides power from the power source to the power distribution trough through the power tap structure and a device requiring electrical power may access power from the power supply apparatus by interfacing with the at least one power conductor strip located in the power distribution trough.

2. The power supply apparatus of claim 1 further comprising a removable power-out-connector, which interfaces with the power distribution trough and provides a port with which the device requiring electrical power may interface instead of having direct interface with the power distribution trough.

3. The power supply apparatus of claim 1, the power-out-connector further comprising two oppositely facing spring prongs, centrally located along one face of a body of the power-out connector such that the prongs may be positioned within the walls of the power distribution trough and when the power-out-connector is twisted, in relation to the power distribution trough, the spring prongs will come into contact with the at least one power conductive strip and each reside underneath one lip.

4. The power supply apparatus of claim 1, the electronic control module further comprising at least one electronic component selected from the set of electronic components consisting of: a wireless signal transmitter, a wireless signal receiver, a wireless signal transceiver, a microprocessor, and a transformer.

5. The power supply apparatus of claim 1, the control module being a self-contained unit removable from the saddle.

6. The power supply apparatus of claim 1, the power supply conduit being a cable with dual insulated conductive wires, the at least one power tap prong of the saddle piercing the insulation to form electrical contact with at least one of the conductive wires.

7. A power supply apparatus comprising:
   a. a power supply conduit comprising a power cord with dual conductors, each surrounded by electrical insulation, said power supply conduit connected to a power source, said power supply conduit positioned along a length of a fixture;
   b. a power tap structure, said power tap structure further comprising:
      i. a saddle containing a portion of the power supply conduit and residing upon the fixture;
      ii. two power tap prongs in operative connection to the power supply conduit, each of said power tap prongs having pierced the electrical insulation surrounding one of the dual conductors to contact the same therein; and
      iii. an electronic control module in operative contact with the at least one power tap prong; and
   c. a power distribution trough in operative contact with the at least one power tap structure and extending a height of the fixture away from the power supply conduit, the power distribution trough further comprising:
      i. a trough body with a base and two walls, each wall having a lip; and
      ii. at least one power conductor strip residing along one wall, underneath one of the lips;
   wherein a device requiring electrical power may access power from the power supply apparatus by interfacing with the power distribution trough.

8. The power supply apparatus of claim 7 further comprising a removable power-out-connector, which interfaces with the power distribution trough and provides a port with which the device requiring electrical power may interface instead of having direct interface with the power distribution trough.

9. The power supply apparatus of claim 7, the power-out-connector further comprising two oppositely facing spring prongs, centrally located along one face of a body of the power-out-connector such that the prongs may be positioned within the walls of the power distribution trough and when the power-out-connector is twisted, in relation to the power distribution trough, the spring prongs will come into contact with the at least one power conductive strip and each reside underneath one lip.

10. The power supply apparatus of claim 7, the electronic control module further comprising at least one electronic component selected from the set of electronic components consisting of: a wireless signal transmitter, a wireless signal receiver, a wireless signal transceiver, a microprocessor, and a transformer.

11. The power supply apparatus of claim 7, the control module being a self-contained unit removable from the saddle.

\* \* \* \* \*